United States Patent
Yamada et al.

(10) Patent No.: US 10,025,009 B2
(45) Date of Patent: Jul. 17, 2018

(54) OPTICAL DEVICE AND IMAGE DISPLAY APPARATUS

(71) Applicant: Seiko Epson Corporation, Tokyo (JP)

(72) Inventors: Fumika Yamada, Matsumoto (JP);
Masatoshi Yonekubo, Hara-mura (JP);
Osamu Yokoyama, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 267 days.

(21) Appl. No.: 14/156,405

(22) Filed: Jan. 15, 2014

(65) Prior Publication Data
US 2014/0204438 A1    Jul. 24, 2014

(30) Foreign Application Priority Data

Jan. 22, 2013 (JP) ................. 2013-009016

(51) Int. Cl.
*G02B 5/18* (2006.01)
*G03H 1/22* (2006.01)
(Continued)

(52) U.S. Cl.
CPC ........... *G02B 5/18* (2013.01); *G02B 27/0172* (2013.01); *G02B 6/0035* (2013.01);
(Continued)

(58) Field of Classification Search
CPC .... G02B 5/18; G02B 27/0172; G02B 6/0035; G02B 6/0076; G02B 2027/0112;
(Continued)

(56) References Cited

U.S. PATENT DOCUMENTS 4,711,512 A * 12/1987 Upatnieks .......... G02B 27/0103
345/7
7,205,960 B2 * 4/2007 David ................ G09G 5/06
345/204
(Continued)

FOREIGN PATENT DOCUMENTS

JP    2001-290102 A    10/2001
JP    2003-329968 A    11/2003
(Continued)

*Primary Examiner* — William R Alexander
*Assistant Examiner* — Wen Huang
(74) *Attorney, Agent, or Firm* — ALG Intellectual Property, LLC

(57) ABSTRACT

An optical device includes a light-conducting member, having a first panel surface disposed facing an image forming unit, that conducts image light incident on a light entry plane formed at an end of the first panel surface to a light exit plane formed in front of the viewer's eye; a first diffractive optics element, provided on the light entry plane, that diffracts the image light incident on the light entry plane in a predetermined direction and transmits that light into the light-conducting member; a second diffractive optics element, provided on the light exit plane, that diffracts the image light exiting from the light exit plane in a predetermined direction and transmits that light to the front of the viewer's eye; and one or more reflective planes disposed within a waveguide for the image light diffracted by the first diffractive optics element.

12 Claims, 8 Drawing Sheets

(51) Int. Cl.
  *G02B 27/01* (2006.01)
  *F21V 8/00* (2006.01)
(52) U.S. Cl.
  CPC .... *G02B 6/0076* (2013.01); *G02B 2027/0112* (2013.01); *G02B 2027/0123* (2013.01); *G02B 2027/0174* (2013.01); *G02B 2027/0178* (2013.01); *G03H 2001/2226* (2013.01)
(58) Field of Classification Search
  CPC .... G02B 2027/0123; G02B 2027/0174; G02B 2027/0178; G03H 2001/2226
  USPC .......................................................... 359/32
  See application file for complete search history.

(56) References Cited

U.S. PATENT DOCUMENTS

| | | | | |
|---|---|---|---|---|
| 7,724,442 B2* | 5/2010 | Amitai | ................ | G02B 6/0056 359/630 |
| 8,743,464 B1* | 6/2014 | Amirparviz | ............ | G02B 27/01 359/633 |
| 8,760,762 B1* | 6/2014 | Kelly | .................... | G02B 21/18 345/7 |
| 2001/0010598 A1* | 8/2001 | Aritake | .............. | G02B 27/0172 359/630 |
| 2004/0004767 A1 | 1/2004 | Song | | |
| 2004/0174348 A1* | 9/2004 | David | ...................... | G09G 5/06 345/204 |
| 2006/0132914 A1 | 6/2006 | Weiss et al. | | |
| 2006/0221448 A1* | 10/2006 | Nivon | .................. | G02B 5/1814 359/572 |
| 2006/0228073 A1 | 10/2006 | Mukawa et al. | | |
| 2007/0008624 A1 | 1/2007 | Hirayama | | |
| 2007/0070504 A1 | 3/2007 | Akutsu et al. | | |
| 2007/0070859 A1* | 3/2007 | Hirayama | ................ | G02B 5/32 369/112.04 |
| 2008/0239424 A1 | 10/2008 | Mukawa et al. | | |
| 2009/0141324 A1 | 6/2009 | Mukawa | | |
| 2009/0190094 A1* | 7/2009 | Watanabe | ............ | G02B 6/0026 351/211 |
| 2010/0079865 A1 | 4/2010 | Saarikko et al. | | |
| 2010/0220295 A1 | 9/2010 | Mukawa et al. | | |
| 2010/0231693 A1 | 9/2010 | Levola | | |
| 2011/0211239 A1 | 9/2011 | Mukawa et al. | | |
| 2012/0081789 A1 | 4/2012 | Mukawa et al. | | |
| 2012/0206811 A1 | 8/2012 | Mukawa et al. | | |
| 2012/0243063 A1 | 9/2012 | Mukawa | | |
| 2013/0155513 A1 | 6/2013 | Mukawa et al. | | |
| 2015/0355467 A1 | 12/2015 | Mukawa et al. | | |
| 2016/0170215 A1 | 6/2016 | Mukawa et al. | | |

FOREIGN PATENT DOCUMENTS

| | | |
|---|---|---|
| JP | 2007-011057 A | 1/2007 |
| JP | 2007-094175 A | 4/2007 |
| JP | 2009-031708 A | 2/2009 |
| JP | 2009-133998 A | 6/2009 |
| JP | 2012-008357 A | 1/2012 |
| KE | 2012-008433 A | 1/2012 |
| WO | WO-2005-088384 A | 9/2005 |
| WO | WO-2005-093493 A | 10/2005 |

* cited by examiner

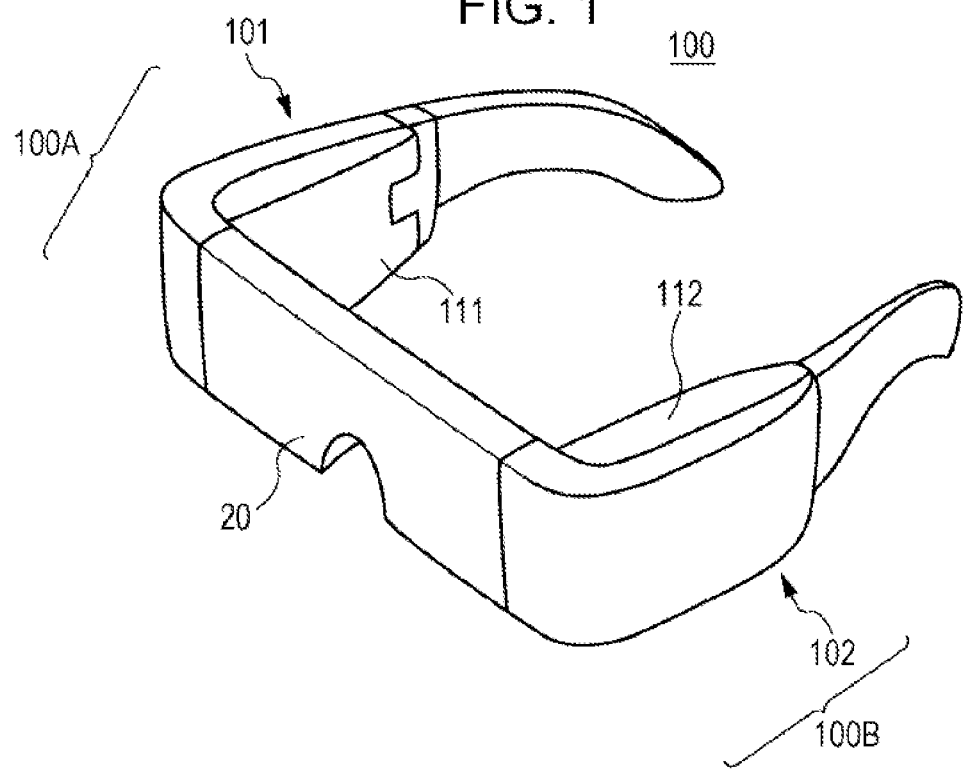
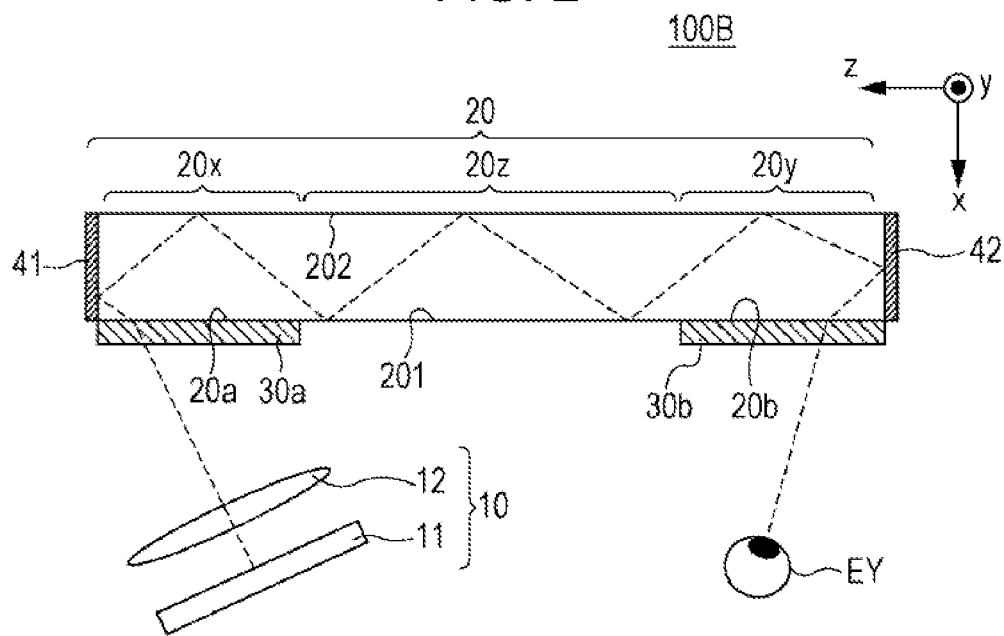

OPTICAL DEVICE AND IMAGE DISPLAY APPARATUS

BACKGROUND

1. Technical Field

The present invention relates to optical devices that employ light-conducting members and diffractive optics elements, and to image display apparatuses provided with such optical devices.

2. Related Art

Head-mounted displays that use a light-conducting member to conduct and display an image from an image display apparatus in front of a viewer's eye have been commercialized in recent years as a type of image projection apparatus, and further miniaturization, wider angles of view, and higher efficiencies in such head-mounted displays are being developed. In this context, diffractive optics elements are garnering attention as elements for admitting and emitting light into and out of a light-conducting member. A diffractive optics element can control the travel direction of light by using the diffraction phenomenon, and provides a smaller-size element and higher level of freedom with which light can be manipulated than when using reflection or refraction.

Among such diffractive optics elements, volume holograms in particular can diffract light with comparatively high efficiency. However, with volume holograms, the wavelength, angle, and so on of the diffracted light are determined according to the Bragg condition, and the angle and wavelength of the diffracted light are greatly influenced by the angle of incidence. When using a diffractive optics element in an image display apparatus such as a head-mounted display, there are thus cases where the display image is increasingly affected in terms of its angle of view (size) and color unevenness. Accordingly, image display apparatuses that adjust the angle of incidence of a volume hologram have been proposed in the past (for example, see JP-A-2007-94175 and JP-A-2009-133998).

The image display apparatus disclosed in JPA-2007-94175 partially varies the angle of slope of an interference pattern in order to suppress the wavelength of diffracted light from changing as the angle of incidence changes under the Bragg condition, and reduces the occurrence of color unevenness in a display image.

Meanwhile, the image display apparatus disclosed in JP-A-2009-133998 reduces wavelength selectivity caused by the Bragg condition by tilting an optical axis of light entering a diffractive optics element, controlling a diffractable wavelength range and reducing problems such as color unevenness.

However, partially varying the angle of slope of an interference pattern as with the image display apparatus disclosed in JP-A-2007-94175 has a problem in that it is difficult to realize in manufacturing and thus lacks practical applicability. On the other hand, in the case where the angle of incidence is tilted in a direction that reduces wavelength selectivity as with the image display apparatus disclosed in JP-A-2009-133998, that direction will widen the angle of the light entering into and exiting from the light-conducting member; when used in a head-mounted display that is worn on the viewer's head area, there is a problem in that the positional relationship between the left and right light-conducting members and an image forming apparatus will not conform to the shape of the viewer's head, resulting in a poor fit on the viewer's face and a corresponding sense of discomfort during use.

SUMMARY

It is an advantage of some aspects of the invention to provide an optical device capable of achieving a higher level of miniaturization, a wider angle of view, and a higher efficiency while eliminating manufacturing difficulties, and to provide an image display apparatus that includes such an optical device.

An optical device according to a first aspect of the invention includes an image forming unit that emits image light, a light-conducting member including a light entry plane and a light exit plane, a first diffractive optics element positioned between the light entry plane of the light-conducting member and the image forming unit, and a reflective layer positioned on the light-conducting member at a different area than the light entry plane; here, the image light is at least partially diffracted by the first diffractive optics element and becomes diffracted image light, at least some of the diffracted image light enters into the light-conducting member from the light entry plane of the light-conducting member, and the reflective layer is provided in a position that is struck by at least some of the diffracted image light that has entered into the light-conducting member.

Note that the "image forming unit" in the optical device according to the first aspect of the invention described above includes image display apparatuses such as liquid-crystal displays that display images, laser scanning displays that enable viewers to recognize images by scanning laser light, and so on, as well as optical systems that focus and convert image light emitted from image displays. Furthermore, in this aspect of the invention, the "reflective surface" can, for example, be disposed on any plane of an inner plane of the light-conducting member on a light entry side thereof or an inner plane on a light exit side thereof, or both planes; and reflective surfaces can be disposed in any position, at any angle, and at any number in a waveguide within the light-conducting member.

According to the optical device according to the first aspect of the invention as described above, the first diffractive optics element that diffracts the image light in a predetermined direction is disposed on the light entry plane, and the image light that has entered the light-conducting member is diffracted in the predetermined direction as a result; furthermore, the image light is reflected in a desired direction within the light-conducting member by the reflective layer disposed in the waveguide within the light-conducting member. Through this, the angle of incidence of the image light incident on the light-conducting member from the image forming unit can be set to a desired angle. As a result, with the optical device according to the first aspect of the invention, even in the case where incident light from a image forming unit is tilted relative to an optical axis in order to obtain a wide angle of view, the positional relationships of the left and right light-conducting members and image forming apparatuses can be matched to the shape of the viewer's face, the positions of both eyes, and so on. Furthermore, in the case where the optical device according to the first aspect of the invention is applied in a head-mounted display that is worn on a viewer's head area, the fit to the viewer's face can be improved as well.

In the optical device according to the aforementioned first aspect of the invention, it is preferable for the optical device to further include a second diffractive optics element positioned on the light exit plane of the light-conducting member, and the reflective layer positioned on the light-conducting member at a different area than the light exit plane. In this case, the image light diffracted by the first diffractive optics element at the light entry plane is further diffracted by the second diffractive optics element at the light exit plane, and thus the positional relationships of the left and right light-conducting members and image forming apparatuses can be more accurately matched to the shape of the viewer's face, the positions of both eyes, and so on.

In the optical device according to the aforementioned first aspect of the invention, it is preferable for the light-conducting member to include a light entry portion that is an area between the light entry plane and a plane that faces the light entry plane, a light exit portion that is an area between the light exit plane and a plane that faces the light exit plane, and a light conducting portion that is an area between the light entry portion and the light exit portion; and the reflective layer positioned on a plane located in an area of the light-conducting member that is on the opposite side of the light conducting portion as the light exit portion.

An optical device according to a second aspect of the invention includes an image forming unit that emits image light, a light-conducting member including a light entry plane and a light exit plane, a first diffractive optics element positioned on a plane of the light-conducting member that faces the light entry plane, and a reflective layer positioned on the light-conducting member at a different area than the light entry plane; here, at least some of the image light enters into the light-conducting member from the light entry plane of the light-conducting member as incident light; the incident light is at least partially diffracted by the first diffractive optics element and becomes diffracted image light; and the reflective layer is provided in a position that is struck by at least some of the diffracted image light.

Note that the "image forming unit" in the optical device according to the second aspect of the invention described above also includes image display apparatuses such as liquid-crystal displays that display images and so on, as well as optical systems that focus and convert image light emitted from image displays. Likewise, in this aspect of the invention as well, the "reflective surface" can, for example, be disposed on any plane of an inner plane of the light-conducting member on a light entry side thereof or an inner plane on a light exit side thereof, or both planes; and reflective surfaces can be disposed in any position, at any angle, and at any number in a waveguide within the light-conducting member.

According to the optical device according to the second aspect of the invention as described above, the first diffractive optics element that diffracts the image light in a predetermined direction is disposed on a plane that faces the light entry plane, and the image light that has entered the light-conducting member is diffracted in the predetermined direction as a result; furthermore, the diffracted image light is reflected by the reflective layer. Accordingly, with the optical device according to this aspect of the present invention, the angle of incidence of the image light incident on the light-conducting member from the image forming unit or the angle of the light exiting from the light-conducting member toward the viewer's eye can be set to a desired angle, and thus the positional relationships of the left and right light-conducting members and image forming apparatuses can be matched to the shape of the viewer's face, the positions of both eyes, and so on. Furthermore, in the case where the optical device according to this aspect of the invention is applied in a head-mounted display that is worn on a viewer's head area, the fit to the viewer's face can be improved as well.

In the optical device according to the aforementioned second aspect of the invention, it is preferable for the optical device to further include a second diffractive optics element positioned on a plane of the light-conducting member that faces the light exit plane, and the reflective layer positioned on the light-conducting member at a different area than the light exit plane. In this case, the image light diffracted by the first diffractive optics element is further diffracted by the second diffractive optics element positioned on a plane that faces the light exit plane, and thus the positional relationships of the left and right light-conducting members and image forming apparatuses can be more accurately matched to the shape of the viewer's face, the positions of both eyes, and so on.

In the optical device according to the aforementioned second aspect of the invention, it is preferable for the light-conducting member to include a light entry portion that is an area between the light entry plane and a plane that faces the light entry plane, a light exit portion that is an area between the light exit plane and a plane that faces the light exit plane, and a light conducting portion that is an area between the light entry portion and the light exit portion; and the reflective layer positioned on a plane located in an area of the light-conducting member that is on the opposite side of the light conducting portion as the light entry portion.

In the optical devices according to the aforementioned first and second aspects of the invention, it is preferable for the first diffractive optics element and the second diffractive optics element to both be formed as volume holograms. In this case, a high diffraction efficiency can be obtained across a wide angle of incidence range.

In the optical devices according to the aforementioned first and second aspects of the invention, it is preferable for the first diffractive optics element and the second diffractive optics element to both be surface relief holograms. In this case, by forming the first and second diffractive optics elements as surface relief holograms, it is easier to mass-produce the apparatus.

In the optical devices according to the aforementioned first and second aspects of the invention, it is preferable for the first diffractive optics element and the second diffractive optics element to both be slanted surface relief holograms. In this case, by slanting one of the grating shapes relative to the optical axis of the conducted light, plus first-order diffracted light, for example, can be intensified, and an effect of reducing the occurrence of noise light during transmission can be achieved.

In the optical devices according to the aforementioned first and second aspects of the invention, it is preferable for the first diffractive optics element and the second diffractive optics element to both be diffractive elements having blazed gratings formed in their surfaces. In this case, by using blazed gratings in the first diffractive optics element and the second diffractive optics element, first-order diffraction efficiency can be increased, which in turn makes it possible to improve the efficiency at which light is transmitted to the light-conducting member.

In the optical devices according to the aforementioned first and second aspects of the invention, it is preferable for a grating period of the first diffractive optics element and a grating period of the second diffractive optics element to be the same grating period. In this case, the optical axes of entering light and exiting light can be made parallel.

An optical device according to a third aspect of the invention includes an image forming unit that emits image light, a first light-conducting member including a first light entry plane and a first light exit plane, a first diffractive optics element positioned between the first light entry plane of the first light-conducting member and the image forming unit, a second diffractive optics element positioned on the first light exit plane of the first light-conducting member, a first reflective layer positioned on a different area of the first light-conducting member than the first light entry plane and the first light exit plane, a second light-conducting member including a second light entry plane and a second light exit plane, a third diffractive optics element positioned between the second light entry plane of the second light-conducting member and the first light-conducting member, a fourth diffractive optics element positioned between the second light exit plane of the second light-conducting member and the first light-conducting member, and a second reflective layer positioned on a different area of the second light-conducting member than the second light entry plane and the second light exit plane; here, the image light is at least partially diffracted by the first diffractive optics element and becomes first diffracted image light, at least some of the first diffracted image light is conducted into the first light-conducting member, the first reflective layer is provided in a position that is struck by at least some of the first diffracted image light conducted into the first light-conducting member, at least some of the image light not diffracted by the first diffractive optics element is diffracted by the third diffractive optics element and becomes second diffracted image light, at least some of the second diffracted image light enters into the second light-conducting member from the second light entry plane of the second light-conducting member, the second reflective layer is provided in a position that is struck by at least some of the second diffracted image light conducted into the second light-conducting member, a grating period of the first diffractive optics element and a grating period of the third diffractive optics element are the different grating periods, and a grating period of the second diffractive optics element and a grating period of the fourth diffractive optics element are the different grating periods.

According to this aspect of the invention, by stacking the first light-conducting member and the second light-conducting member and using diffractive optics elements having different grating periods in each light-conducting member, each light-conducting member can transmit different wavelengths of light, and thus the diffraction efficiency for a plurality of wavelengths can be increased.

An image display apparatus according to an aspect of the invention includes the optical device according to the aforementioned aspects of the invention. Such an image display apparatus may include an image forming unit such as a liquid-crystal display, a collimate optical system, or the like, and can be applied in a form that is worn on a viewer's head area, such as a head-mounted display.

According to this aspect of the invention, it is also possible to obtain an optical device that improves the fit to the viewer's face and achieves a wide angle of view while eliminating manufacturing difficulties and reduce manufacturing costs, even in an image display apparatus in a form worn on a viewer's head area such as a head-mounted display.

BRIEF DESCRIPTION OF THE DRAWINGS

The invention will be described with reference to the accompanying drawings, wherein like numbers reference like elements.

FIG. 1 is a perspective view providing an overview of a head-mounted display according to a first embodiment.

FIG. 2 is a cross-sectional view illustrating primary components of the internal structure and a waveguide of the head-mounted display according to the first embodiment.

FIG. 3A is a graph illustrating a diffraction efficiency of a diffractive optics element optimized for light at an optical axis tilt of 0° and FIG. 3B is a graph illustrating a diffraction efficiency of a diffractive optics element optimized for light whose optical axis tilt is −20°.

FIG. 4A is an explanatory diagram illustrating a case where image light at an optical axis tilt of 0° is used and FIG. 4B is an explanatory diagram illustrating a case where image light whose optical axis tilt is −20° is used.

FIG. 6A is an explanatory diagram illustrating positions of each apparatus when a past head-mounted display is worn, whereas

FIG. 7A is a cross-sectional view of primary components illustrating the internal structure and a waveguide in a left-eye optical system according to a second embodiment, whereas

DESCRIPTION OF EXEMPLARY EMBODIMENTS

Figure 3A:
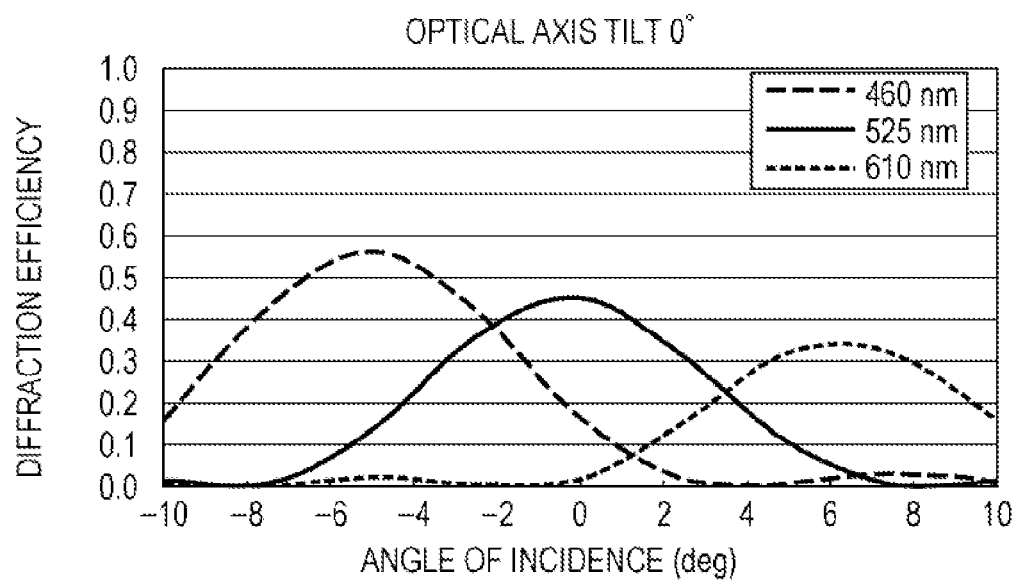
FIGS. 3A and 3B are graphs, each illustrating a diffraction efficiency relative to variations in the angle of incidence of each RGB wavelength based on the optical axis tilt of incident light entering a transmissive volume hologram, where

Hereinafter, various embodiments of the invention will be described in detail with reference to the appended drawings. Note that in the drawings, the ratios between the dimensions of the various elements have been changed from the actual ratios in order to facilitate the descriptions. Although the following embodiments describe an example of an optical device according to the invention being applied in a head-mounted display serving as an example of an image display apparatus that is worn on a viewer's head area, the embodiments are merely examples, and are not intended to limit the invention; many modifications can be made without departing from the technical scope of the invention.

First Embodiment

Overall Configuration of Head-Mounted Display

FIG. 1 is a perspective view providing an overview of a head-mounted display 100 according to a first embodiment. As shown in FIG. 1, the head-mounted display 100 according to this embodiment is a head-mounted display having the external appearance of a pair of eyeglasses; by donning the head-mounted display 100, a viewer can view image light from a virtual image while at the same time viewing his or her surroundings through the head-mounted display.

Specifically, the head-mounted display 100 includes a light-conducting member 20, a pair of left and right temple supports 101 and 102 that support the light-conducting member 20, and a pair of image forming apparatuses 111 and 112 provided in the temple supports 101 and 102. As shown in FIG. 1, a first image display apparatus 100A that combines a left side of the light-conducting member 20 with the image forming apparatus 111 corresponds to a portion that forms a right-eye virtual image, and also functions as a standalone image display apparatus. Likewise, as shown in FIG. 1, a second image display apparatus 100B that combines a right side of the light-conducting member 20 with the image forming apparatus 112 corresponds to a portion that forms a left-eye virtual image, and also functions as a standalone image display apparatus.

The internal structure and the light-conducting member of this head-mounted display 100 will be described next. FIG. 2 is a cross-sectional view schematically illustrating primary components of the internal structure and the light-conducting member of the head-mounted display according to this embodiment. As shown in FIG. 2, the second image display apparatus 100B includes an image forming unit 10 and the light-conducting member 20.

The image forming unit 10 includes an image display apparatus 11 and a projection optical system 12. The image display apparatus 11 is, in this embodiment, a liquid-crystal display device, and emits light containing red, green, and blue colors from a light source; the light from the light source is diffused, forming a light flux having a rectangular cross-section, which is emitted toward the projection optical system 12. Meanwhile, the projection optical system 12 is a collimate lens that converts the image light emitted from each point on the image display apparatus 11 into parallel light fluxes incident on the light-conducting member 20. In this embodiment, the image forming unit 10 is disposed at a tilt relative to a normal direction perpendicular to the light-conducting member 20 in order to obtain a wide angle of view.

The light-conducting member 20 is formed having an external appearance of a plate-shaped member that extends parallel to a YZ plane in the drawings. The light-conducting member 20 is a plate-shaped member formed of a light-transmissive resinous material or the like, and includes a first panel surface 201 arranged facing the image forming unit 10 and a second panel surface 202 that faces the first panel surface 201; image light enters through a light entry plane 20a formed at an end portion of the first panel surface 201 and is conducted by the first panel surface 201 and the second panel surface 202 to a light exit plane 20b formed in front of the viewer's eye.

To describe in further detail, the light-conducting member 20 includes the light entry plane 20a serving as a light entry portion for capturing image light from the image forming unit 10 and the light exit plane 20b for emitting the image light toward the viewer's eye EY, the stated surfaces being formed on a rear side plane or viewer-side plane that oppose the image forming unit 10 parallel to the YZ plane. The light entry plane 20a is provided with a first diffractive optics element 30a that diffracts incident light toward an end surface on the temple support 102 side that is near a light entry position, and the light exit plane 20b is provided with a second diffractive optics element 30b that diffracts and transmits the image light emitted from the light exit plane 20b toward the exterior and projects the light to the viewer's eye EY as virtual image light. In other words, the light-conducting member 20 includes a light entry portion 20x corresponding to an area between the light entry plane 20a and a surface facing the light entry plane 20a, a light exit portion 20y corresponding to an area between the light exit plane 20b and a surface facing the light exit plane 20b, and a light conducting portion 20z corresponding to an area between the light entry portion 20x and the light exit portion 20y.

In this embodiment, transmissive volume holograms are employed for the first diffractive optics element 30a and the second diffractive optics element 30b, and the first diffractive optics element 30a and the second diffractive optics element 30b have the same grating period. The first diffractive optics element 30a and the second diffractive optics element 30b have opposite grating patterns, and image light entering the light-conducting member 20 from the light entry plane 20a is diffracted and conducted to the end surface side (the temple support side) of the light-conducting member 20, reflected by a reflective layer 41, and is then conducted toward the viewer's eye within the light-conducting member 20. Then, on the light exit plane 20b side, the light is reflected by a reflective layer 42 at an end of a waveguide (on the viewer's nose side), is diffracted by the second diffractive optics element 30b at the light exit plane 20b, and is emitted toward the eye EY. In other words, the reflective layer 41 is provided on an inner surface of the light-conducting member 20 on the light entry plane 20a side (temple support side) thereof, the reflective layer 42 is provided on the light exit plane 20b (nose side) thereof, and the reflective layer 41 and the reflective layer 42 are disposed so as to face each other. Here, the reflective layer 41 and the reflective layer 42 are provided in positions struck by at least some of the diffracted image light entering into the light-conducting member 20, and make contact with the light-conducting member 20 at different areas from the light entry plane 20a. Furthermore, the reflective layer 41 makes contact with a surface on the opposite side as the light exit portion 20y relative to the light conducting portion 20z of the light-conducting member 20.

The light-conducting member 20 includes the first and second panel surfaces 201 and 202 that face each other and extend parallel to the YZ plane, which each reflect all of the image light reflected by the reflective layer 41 on the light entry side and conduct that light to the front of the viewer's eye. To describe in more detail, the image light reflected by the reflective layer 41 first enters the second panel surface 202 and is completely reflected thereby, and then enters the first panel surface 201 and is completely reflected thereby. The image light is conducted to the reflective layer 42 provided on the other end of the light-conducting member 20 by repeating this operation. Note that the configuration may be such that outside light entering the panel surfaces 201 and 202 from the external surroundings passes through the light-conducting member 20 at a high level of transmissibility rather than providing the first and second panel surfaces 201 and 202 with reflective coatings. This makes it possible to configure the light-conducting member 20 as a see-through type through which the surroundings can be seen.

The reflective layer 42 provided on the other end of the light-conducting member 20 reflects the image light toward the light exit plane 20b of the light-conducting member 20, causing the image light to traverse the second diffractive optics element 30b while being diffracted at a predetermined angle and exit to the exterior. The image light emitted to the exterior from the second diffractive optics element 30b enters the viewer's eye EY as the virtual image light. By forming the virtual image light on the viewer's retina, the viewer can view image light, such as video light, produced by the virtual image.

Note that in this embodiment, in order for the image light entering the light-conducting member 20 via the first diffractive optics element 30a to be reflected by the reflective layer 41 and transmitted through appropriate complete reflection within the light-conducting member 20, the image light is recorded so that the diffraction angle of the first diffractive optics element 30a is greater than or equal to a critical angle.

Setting Angle of Incidence

Figure 4A:
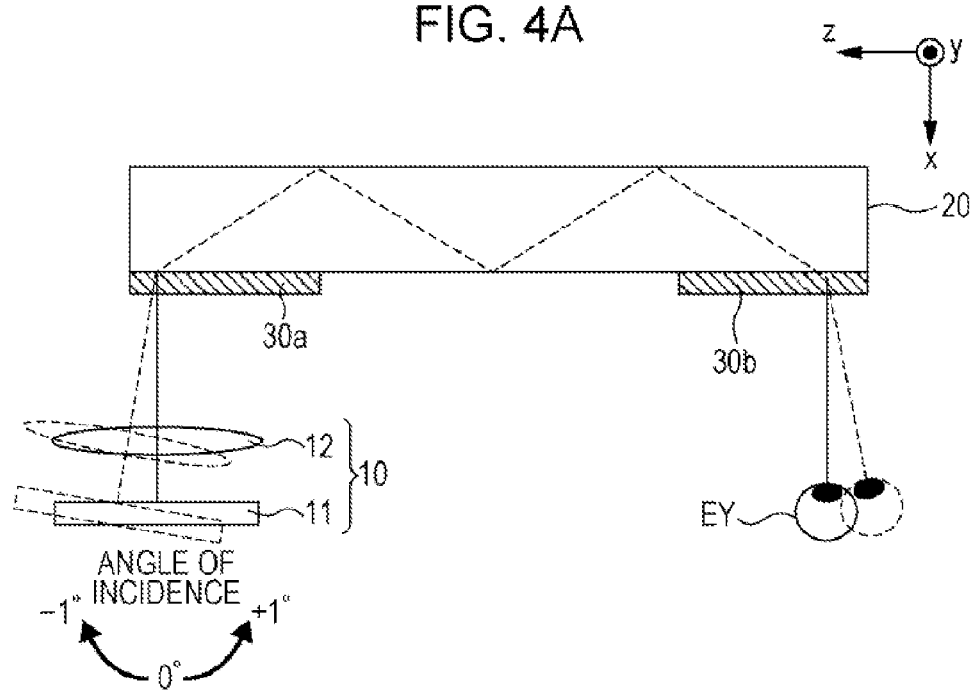
FIGS. 4A and 4B are explanatory diagrams, each illustrating a waveguide in a light-conducting member and the position of an image display apparatus based on the optical axis tilt of incident light entering a transmissive volume hologram, where
Figure 4B:
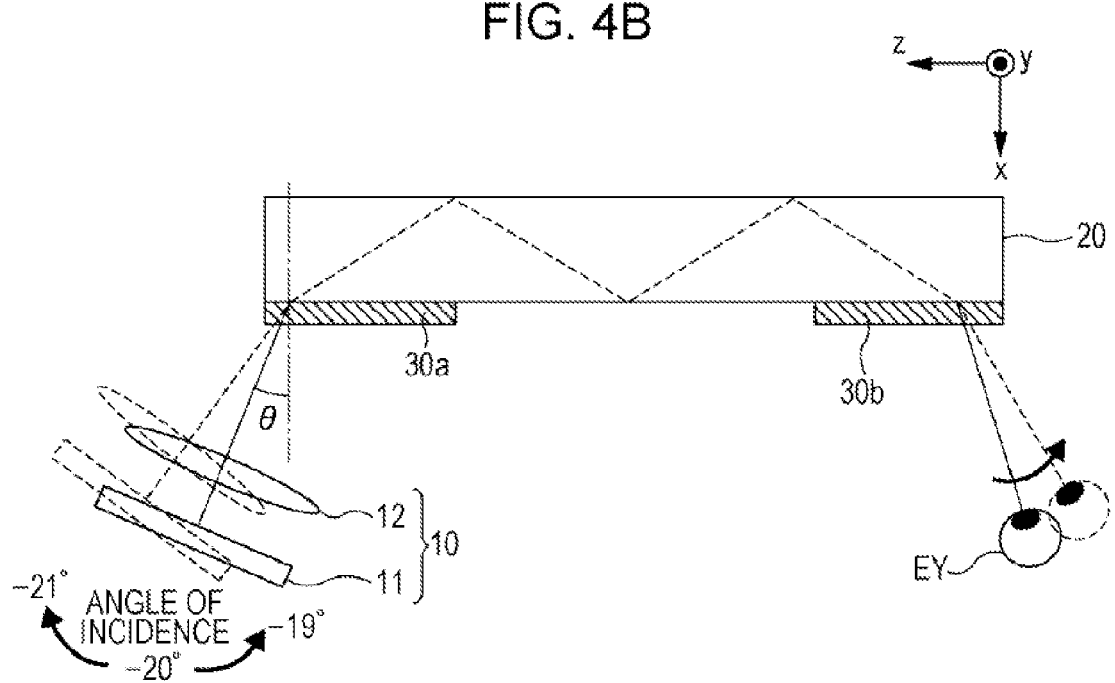

Next, the angle of incidence relative to the diffractive optics elements will be described. In this embodiment, a volume hologram is used for the diffractive optics element, and thus the diffraction efficiency changes greatly depending on the angle of incidence of the light flux, reaching a maximum diffraction efficiency at a specific angle of incidence (a Bragg angle). Accordingly, to increase the diffraction efficiency, the angle of incidence of the image light emitted from the image forming unit 10 is set to a predetermined angle, as shown in FIGS. 4A and 4B.

Figure 3B:
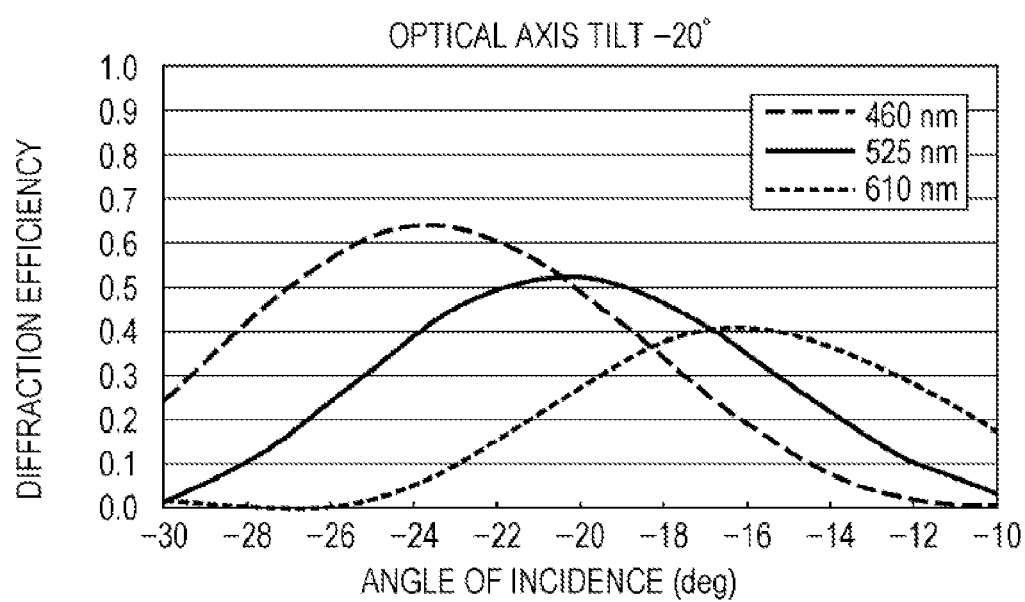

FIGS. 3A and 3B illustrate examples of calculating the angle of incidence and diffraction efficiency of each of R, G, and B wavelengths in the case where the optical axis of incident light is tilted in a thin transmissive volume hologram. As illustrated in FIG. 3A, in the case where the angle of incidence of the image light emitted from the image forming unit 10 is set to an optical axis tilt of 0° (that is, a diffractive optics element optimized for normal incidence), the maximum diffraction efficiency is low and there is a narrow distribution range for the diffraction efficiency above a predetermined value; however, as illustrated in FIG. 3B, in the case where the angle of incidence of the image light emitted from the image forming unit 10 is set to an optical axis tilt of −20° (that is, a diffractive optics element optimized for image light incidence tilted to −20°), the maximum diffraction efficiency is high and there is a wide distribution range for the diffraction efficiency above a predetermined value. It can therefore be seen that setting the angle of incidence relative to the diffractive optics element to be greater and tilting the optical axis achieve a higher diffraction efficiency across a wider angle of incidence range and widen the angle of view.

As described thus far, according to this embodiment, first, with respect to the angle of incidence relative to the diffractive optics element, increasing the optical axis tilt makes it possible to achieve a higher diffraction efficiency across a wider angle of incidence range and set a wider angle of view.

By employing a configuration for the diffractive optics element and the light-conducting member 20 that transmit the image light reflected at an end surface of the light-conducting member 20, an image display apparatus such as a head-mounted display that experiences no worsening in the fit on the viewer's face and is thus easy to wear and use can be achieved, even in the case where the optical axis tilt angle of the incident image light is increased in order to obtain a wide angle of view.

Figure 5:
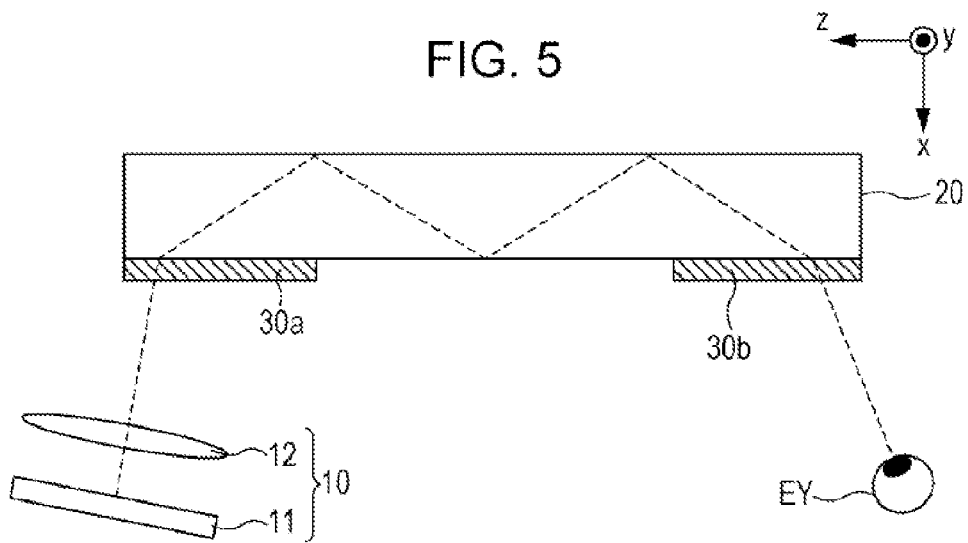
FIG. 5 is an explanatory diagram illustrating the positions of a waveguide and respective apparatuses in a past head-mounted display.
Figure 6A:
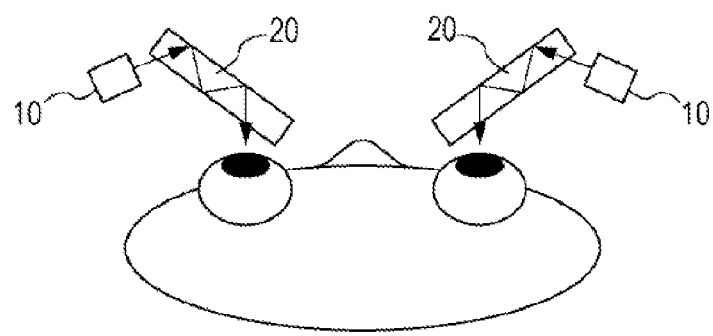

In other words, in the case where a wide optical axis tilt angle is used for the angle of incidence from the image forming unit 10 in a light-conducting member having a past configuration, such as that shown in FIG. 5, an angle of the image forming unit 10 relative to the light-conducting member 20 and an angle of the image forming unit 10 relative to the viewer's line of sight will increase, as shown in FIG. 6A; as a result, the positional relationship between the image forming unit 10 and the light-conducting member 20 will not match the shape of the viewer's face, resulting in the head-mounted display being shaped in the opposite direction as a direction that fits the face, which imparts a sense of discomfort during use.

Figure 6B:
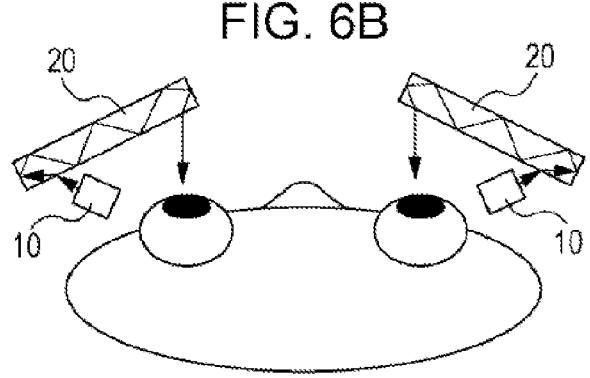
FIG. 6B is an explanatory diagram illustrating positions of each apparatus when the head-mounted display according to the first embodiment is worn.

However, according to the head-mounted display of this embodiment, the head-mounted display can be shaped in a tilted manner so as to fit to the shape of the viewer's face, as shown in FIG. 6B; accordingly, the apparatus can be made more compact, and with a shape that is easier to wear and use.

Second Embodiment

Figure 7A:
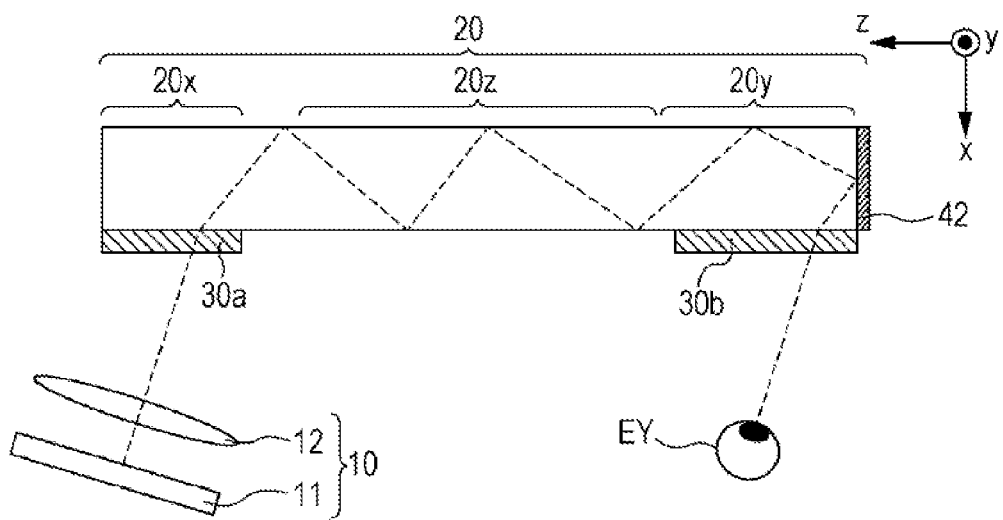

Next, a second embodiment of the invention will be described. This embodiment is configured so that the optical axes of entering image light and exiting image light are parallel to each other. FIG. 7A is a cross-sectional view of primary components illustrating the internal structure and a light-conducting member in a left-eye optical system according to the second embodiment, whereas FIG. 7B is a cross-sectional view of primary components illustrating the internal structure and a light-conducting member in a right-eye optical system according to the second embodiment.

Figure 7B:
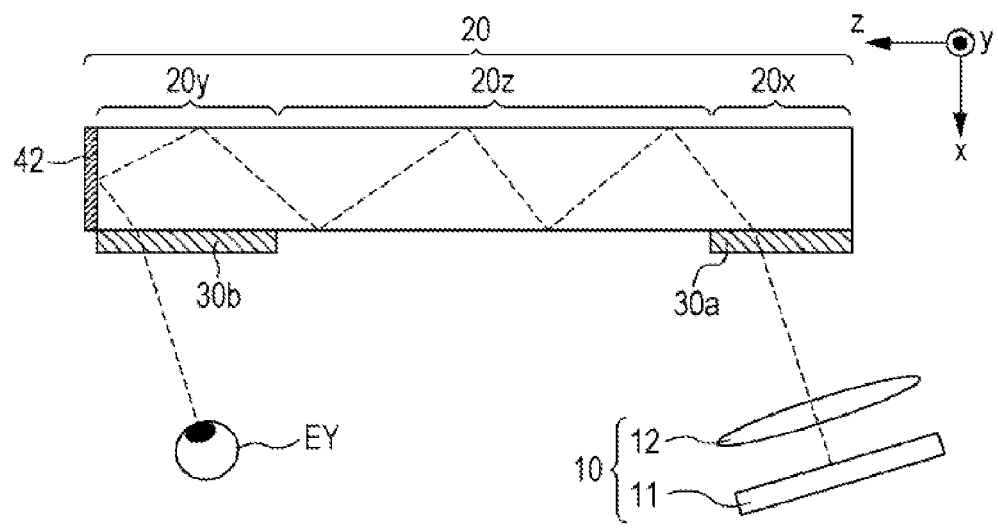
FIG. 7B is a cross-sectional view of primary components illustrating the internal structure and a waveguide in a right-eye optical system according to a second embodiment.

As shown in FIGS. 7A and 7B, the second embodiment employs the same configuration as the aforementioned first embodiment, except that in the light-conducting member 20 that uses transmissive diffractive optics elements, only the reflective layer 42 is disposed at the end of a waveguide on the side of the light-conducting member 20 located toward the second diffractive optics element 30b, and only the end surface of the light-conducting member 20 on the light-emitting side thereof reflects light, while the other end surface does not reflect light. Note that transmissive volume holograms are used for the first diffractive optics element 30a and the second diffractive optics element 30b in this embodiment as well. Furthermore, this embodiment is configured so that the optical axes on the light entry and light exit sides are parallel, by setting the grating period used for each volume hologram to be the same in both the first diffractive optics element 30a and the second diffractive optics element 30b and setting the direction of the interference pattern to be the same on the light entry and light exit sides.

Figure 8A:
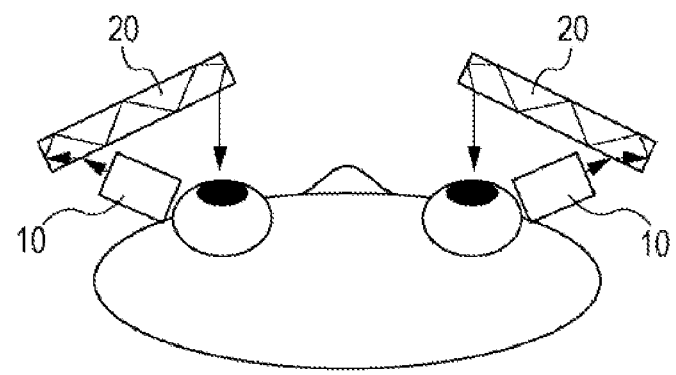
FIGS. 8A and 8B are explanatory diagrams illustrating positions of each apparatus in the case where a head-mounted display whose projection optical system is large is worn.
Figure 8B:
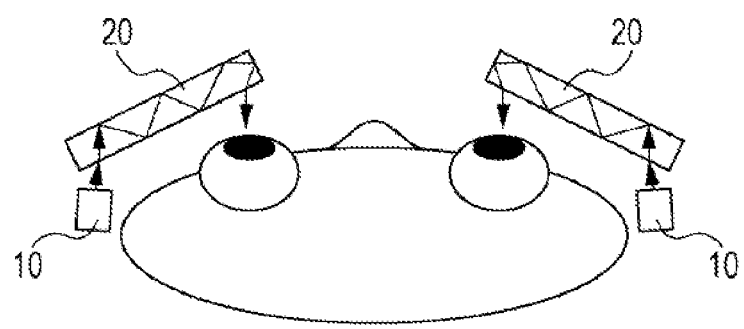

According to this embodiment, the image light diffracted by the first diffractive optics element 30a on the light entry side is then reflected at an end of the waveguide on the second diffractive optics element 30b side, which makes it possible to invert the direction in which light is conducted within the light-conducting member 20 to the opposite direction immediately before the light is emitted from the light-conducting member 20; this in turn makes it possible to make the light entering into the light entry plane 20a parallel to the light emitted from the light exit plane 20b, making it possible to more accurately match the positional relationships of the left and right light-conducting members and image forming apparatuses to the shape of the viewer's face, the positions of both eyes, and so on. In other words, as shown in FIG. 8A, the image forming units 10 may make contact with the viewer's face and disturb the viewer, depending on the size of the projection optical system; however, according to this embodiment, the image forming units 10 can avoid a direction in which the units make contact with the viewer's face, and thus an outer form that further provides a better fit to the face can be achieved, as shown in FIG. 8B.

Furthermore, according to this embodiment, the first diffractive optics element 30a and the second diffractive optics element 30b have the same grating period, and thus light interference between the two diffractions on the light entry and light exit sides, a loss of light, and so on can be reduced; this in turn makes it possible to prevent the brightness of the image from dropping, partial color unevenness from occurring, and so on. Furthermore, because the first diffractive optics element 30a and the second diffractive optics element 30b are formed as volume holograms and the grating patterns of the volume holograms are the same in this embodiment, the optical axes on the light entry side and the light exit side can be made parallel, and a high diffraction efficiency can be achieved across a wide angle of incidence range.

Third Embodiment

Figure 9:
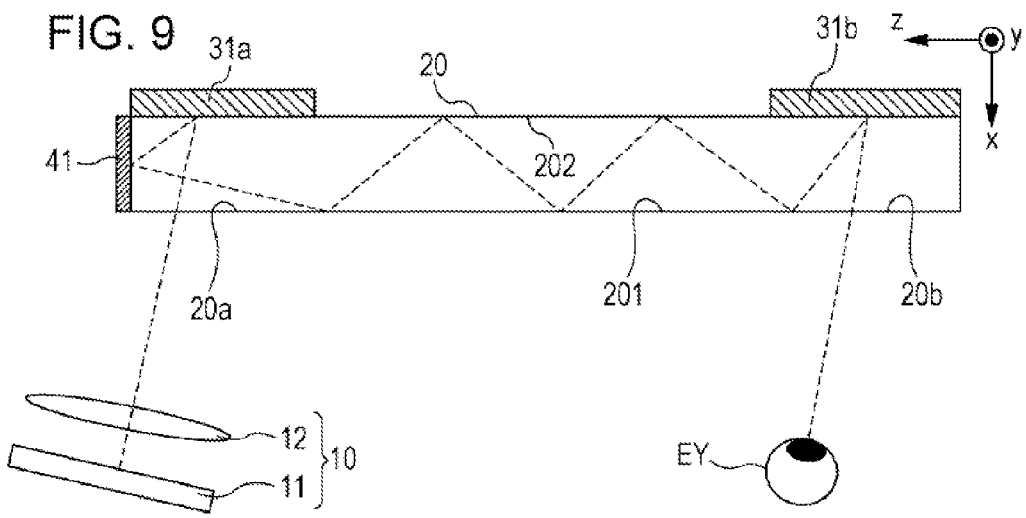
FIG. 9 is a cross-sectional view illustrating primary components of the internal structure and a waveguide of a head-mounted display according to a third embodiment.

Next, a third embodiment of the invention will be described. Although a transmissive diffractive optics element is employed in the aforementioned first embodiment and second embodiment, this embodiment employs a reflective diffractive optics element. FIG. 9 is a cross-sectional view schematically illustrating primary components of the internal structure and a light-conducting member of a head-mounted display according to the third embodiment.

As shown in FIG. 9, a first diffractive optics element 31a is provided in a position on the second panel surface 202 side that faces the light entry plane 20a, and the first diffractive optics element 31a diffracts light entering from the light entry plane 20a to a predetermined direction and reflects that light into the light-conducting member 20; meanwhile, a second diffractive optics element 31b is provided in a position on the second panel surface 202 side that faces the light exit plane 20b, and the second diffractive optics element 31b diffracts the image light conducted within the light-conducting member 20 and reflects that light toward the light exit plane 20b, whereupon the light is emitted to the exterior of the light-conducting member 20 from the light exit plane 20b.

The reflective layer 41 is disposed within the light-conducting member 20, in the waveguide of the image light. In this embodiment, the reflective layer 41 is disposed within the light-conducting member 20 at an end of the waveguide on the first diffractive optics element 31a side; in the light-conducting member 20 that employs the reflective diffractive optics elements 31a and 31b, the end surface of the light-conducting member 20 reflects light only on the light entry side, whereas the end surface on the other side does not reflect light. Note that a single reflective layer or a plurality of reflective layers may be provided, and two reflective layers may be provided on both ends of the light-conducting member 20 as in the aforementioned first embodiment.

Note that reflective volume holograms, for example, are used for the first diffractive optics element 31a and the second diffractive optics element 31b in this embodiment. Furthermore, this embodiment is also configured so that the optical axes on the light entry and light exit sides are parallel, by setting the grating period used for each volume hologram to be the same in both the first diffractive optics element 31a and the second diffractive optics element 31b and setting the direction of the interference pattern to be the same on the light entry and light exit sides.

According to this embodiment, the image light entering the light-conducting member 20 is reflected/diffracted by the first diffractive optics element 31a in the opposite direction as the direction in which the light is conducted within the light-conducting member 20, and is then immediately reversed to the stated conducting direction by the reflective layer 41. The image light is then reflected/diffracted by the second diffractive optics element 31b, and is emitted from the light exit plane 20b toward the viewer's eye EY. Through this, the light entering the light entry plane 20a and the light exiting from the light exit plane 20b can be made parallel, making it possible to more accurately match the positional relationships of the left and right light-conducting members 20 and image forming apparatuses 10 to the shape of the viewer's face, the positions of both eyes, and so on. In other words, as shown in FIG. 8A, the image forming units 10 may make contact with the viewer's face and disturb the viewer, depending on the size of the projection optical system; however, according to this embodiment, the image forming units 10 can avoid a direction in which the units make contact with the viewer's face, and thus an outer form that further provides a better fit to the face can be achieved, as shown in FIG. 8B.

Furthermore, according to this embodiment, the first diffractive optics element 31a and the second diffractive optics element 31b have the same grating period, and thus light interference between the two diffractions on the light entry and light exit sides, a loss of light, and so on can be reduced; this in turn makes it possible to prevent the brightness of the image from dropping, partial color unevenness from occurring, and so on. Furthermore, because the first diffractive optics element 31a and the second diffractive optics element 31b are formed as volume holograms and the grating patterns of the volume holograms are the same in this embodiment, the optical axes on the light entry side and the light exit side can be made parallel, and a high diffraction efficiency can be achieved across a wide angle of incidence range.

First Variation

Although the aforementioned first embodiment to third embodiment employ volume holograms as the diffractive optics elements, the invention is not limited thereto, and various types of diffractive optics elements can be used. The following describes variations that employ other types of diffractive optics elements.

Figure 10:
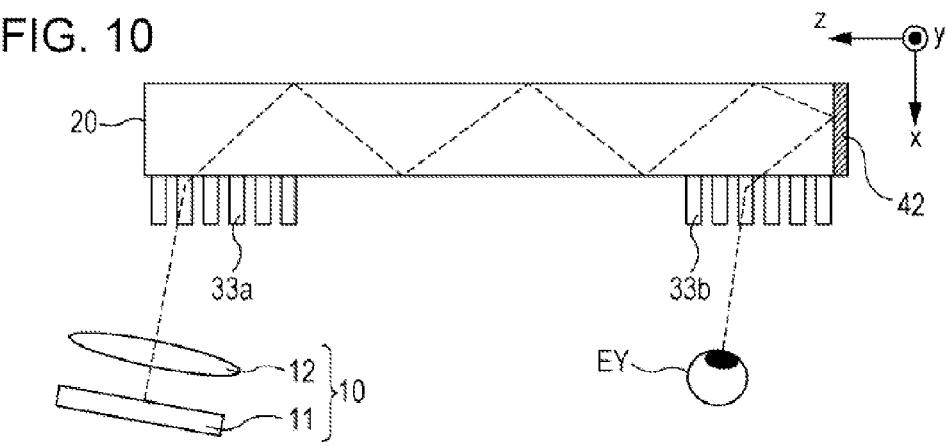
FIG. 10 is a cross-sectional view illustrating primary components of the internal structure and a waveguide of a head-mounted display according to a first modification.

For example, as shown in FIG. 10, surface relief holograms may be used for a first diffractive optics element 33a and a second diffractive optics element 33b. In this case, surface relief holograms are particularly suited to mass production, and thus manufacturing costs can be reduced.

Figure 11:
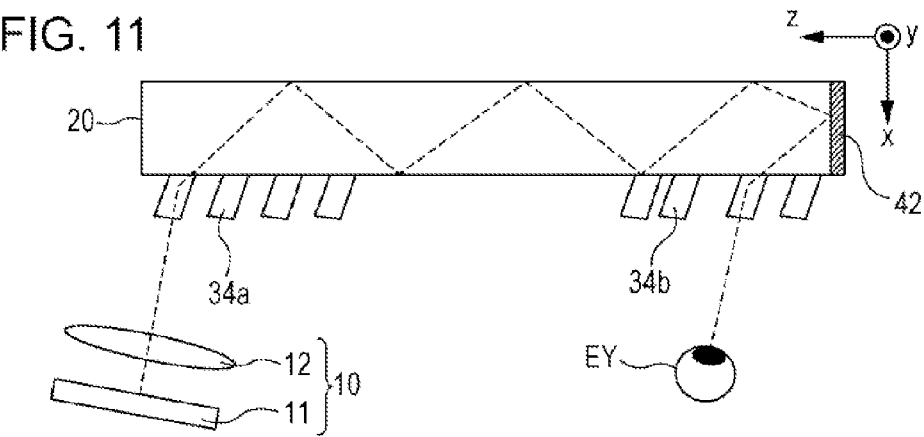
FIG. 11 is a cross-sectional view illustrating primary components of the internal structure and a waveguide of a head-mounted display according to a first variation.

In addition, as shown in FIG. 11, for example, slanted surface relief holograms, in which the surface of a surface relief hologram is slanted, may be used for a first diffractive optics element 34a and a second diffractive optics element 34b. Although an unslanted surface relief hologram produces diffracted light with plus and minus symmetry in both plus and minus first and second order lights, slanting the surface relief hologram in this manner makes it possible to intensify the plus first order diffracted light and obtain effects of improving the efficiency of transmission to the light-conducting member 20 and noise-light reduction. Note that in this case, at least one of the gratings in the first diffractive optics element 34a and the second diffractive optics element 34b may be slanted.

Figure 12:
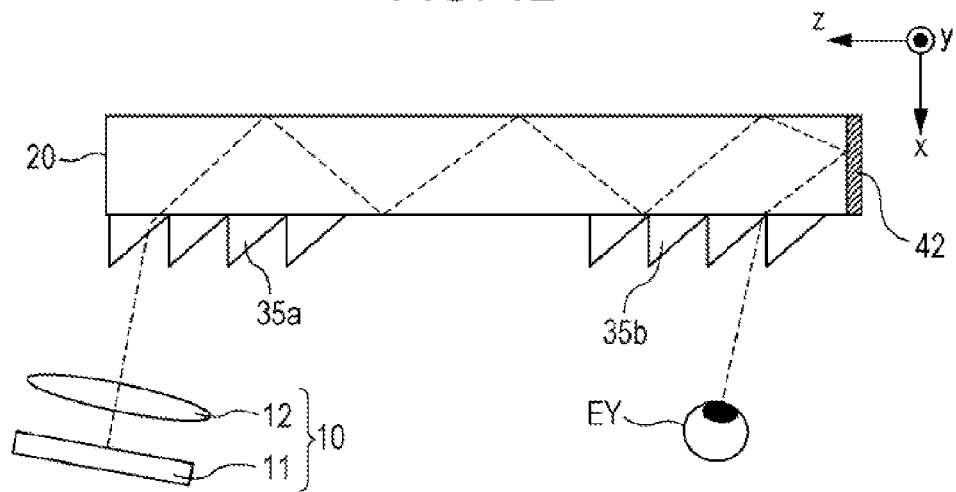
FIG. 12 is a cross-sectional view illustrating primary components of the internal structure and a light-conducting member of the head-mounted display according to the first variation.
Figure 13:
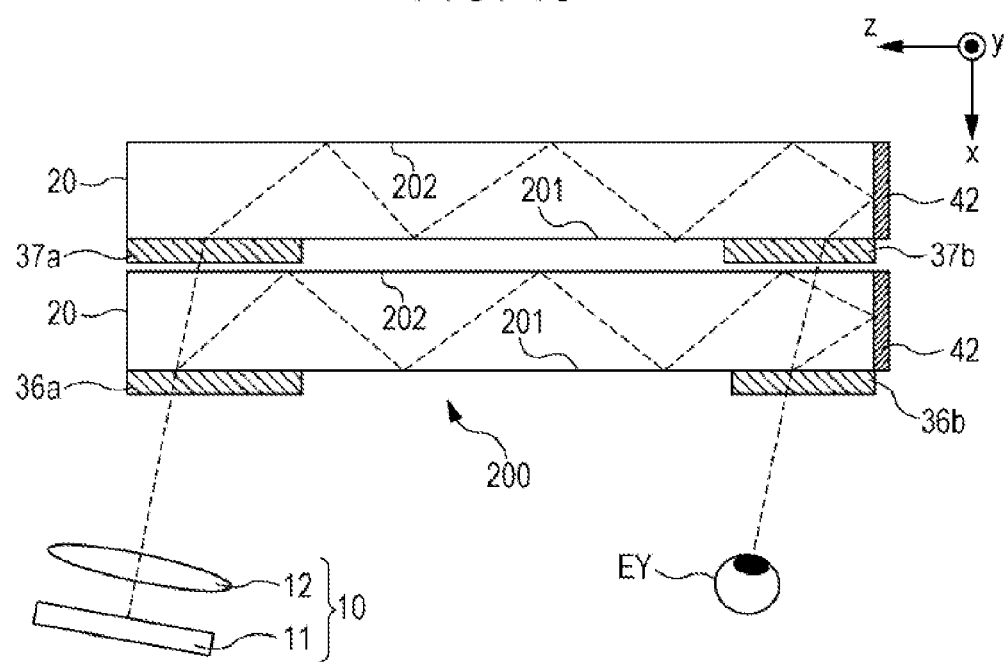
FIG. 13 is a cross-sectional view illustrating primary components of the internal structure and a light-conducting member of a head-mounted display according to a second modification.

Furthermore, as shown in FIG. 12, blazed gratings may be used for a first diffractive optics element 35a and a second diffractive optics element 35b. By using blazed gratings, the efficiency of first-order diffracted light can be increased, and thus effects of improving the efficiency of transmission to the light-conducting member 20 and noise-light reduction can be obtained. Note that in this case as well, at least one of the gratings in the first diffractive optics element 35a and the second diffractive optics element 35b may be a blazed grating.

Second Variation

In the aforementioned first embodiment to third embodiment, a single-layer light-conducting member is used and a single diffractive optics element is used on each of the light entry side and the light exit side; however, the invention is not limited thereto, and a plurality of diffractive optics elements corresponding to the wavelengths of the image light may be used. In other words, in each of the above embodiments, the light-conducting member 20 may be formed as a stacked light-conducting member 200 that is stacked so that the respective panel surfaces 201 and 202 are parallel, and the grating periods of first diffractive optics elements 36a, 37a, and so on and second diffractive optics elements 36b, 37b, and so on provided in the respective light-conducting members 20 and 20 differ from light-conducting member to light-conducting member.

By stacking a plurality of light-conducting members 20 and using diffractive optics elements having different grating periods in each light-conducting member 20 as in this variation, each light-conducting member can transmit different wavelengths of light, and thus the diffraction efficiency for a plurality of wavelengths can be increased.

Although this variation is configured by using a transmissive volume hologram as described in the second embodiment and providing the reflective layer 42 only on the light exit side, it should be noted that the invention is not limited thereto, and it is also possible to stack a plurality of light-conducting members 20 in the configurations described in the aforementioned first embodiment and third embodiment as well.

The following inventions can be understood based on the aforementioned embodiments. An optical device that conducts image light displayed by an image forming unit and forms an image for a viewer, the device including: a light-conducting member, having a first panel surface disposed facing the image forming unit and a second panel surface disposed facing the first panel surface, that conducts the image light incident on a light entry plane formed at an end of the first panel surface to a light exit plane formed in front of the viewer's eye using the first panel surface and the second panel surface; a first diffractive optics element, provided on the light entry plane, that diffracts the image light incident on the light entry plane in a predetermined direction and transmits that light into the light-conducting member; a second diffractive optics element, provided on the light exit plane, that diffracts the image light exiting from the light exit plane in a predetermined direction and transmits that light to the front of the viewer's eye; and one or more reflective layers disposed within the light-conducting member for the image light diffracted by the first diffractive optics element.

An optical device that conducts image light displayed by an image forming unit and forms an image for a viewer, the device including: a light-conducting plate, having a first panel surface disposed facing the image forming unit and a second panel surface disposed facing the first panel surface, that conducts the image light incident on a light entry plane formed at an end of the first panel surface to a light exit plane formed in front of the viewer's eye using the first panel surface and the second panel surface; a first diffractive optics element, provided in a position on the second panel surface side facing the light entry plane, that diffracts the light incident on the light entry plane in a predetermined direction and reflects the light into the light-conducting plate; a second diffractive optics element, provided in a position on the second panel surface side facing the light exit plane, that diffracts the image light conducted within the light-conducting plate in a predetermined direction and reflects that light toward the light exit plane; and one or more reflective layers disposed within a waveguide for the image light diffracted by the first diffractive optics element.

The entire disclosure of Japanese Patent Application No. 2013-009016, filed Jan. 22, 2013 is expressly incorporated by reference herein.

What is claimed is:

1. An optical device comprising:
an image forming unit that emits image light;
a light-conducting member including:
   a light entry plane and a light exit plane,
   an opposite plane that faces the light entry plane and the light exit plane,
   a light entry portion comprising an area between the light entry plane and the opposite plane and including the light entry plane and a portion of the opposite plane facing the light entry plane, and
   a light exit portion comprising an area between the light exit plane and the opposite plane and including the light exit plane and another portion of the opposite plane facing the light exit plane;
a first diffractive optics element positioned between the light entry plane of the light-conducting member and the image forming unit;
a second diffractive optics element positioned on the light exit plane of the light-conducting member; and
a reflective layer positioned on the light-conducting member at an area other than on the opposite plane,
wherein:
   the image light is at least partially diffracted by the first diffractive optics element and becomes diffracted image light;
   at least some of the diffracted image light enters into the light-conducting member from the light entry plane of the light-conducting member;
   the reflective layer is provided in a position that reflects at least some of the diffracted image light that has entered into the light-conducting member directly to the second diffractive optics element; and
   a width of the reflective layer is smaller than a width of the second diffractive optics element.

2. The optical device according to claim 1, wherein the reflective layer is further positioned on the light-conducting member at an area other than the light exit plane.

3. The optical device according to claim 2,
wherein the reflective layer is positioned on another plane located in the light exit portion, the another plane being a plane different from the light exit plane and the opposite plane.

4. The optical device according to claim 2,
wherein the first diffractive optics element and the second diffractive optics element are both volume holograms.

5. The optical device according to claim 2,
wherein the first diffractive optics element and the second diffractive optics element are both surface relief holograms.

6. The optical device according to claim 2,
wherein the first diffractive optics element and the second diffractive optics element are both slanted surface relief holograms.

7. The optical device according to claim 2,
wherein the first diffractive optics element and the second diffractive optics element are both diffractive elements having blazed gratings formed in their surfaces.

8. The optical device according to claim 2,
wherein a grating period of the first diffractive optics element and a grating period of the second diffractive optics element are the same grating period.

9. An optical device comprising:
an image forming unit that emits image light;
a first light-conducting member including:
　a first light entry plane and a first light exit plane,
　a first opposite plane that faces the first light entry plane and the first light exit plane,
　a first light entry portion comprising an area between the first light entry plane and the first opposite plane and including the first light entry plane and a portion of the first opposite plane facing the first light entry plane, and
　a first light exit portion comprising an area between the first light exit plane and the first opposite plane and including the first light exit plane and another portion of the first opposite plane facing the first light exit plane;
a first diffractive optics element positioned between the first light entry plane of the first light-conducting member and the image forming unit;
a second diffractive optics element positioned on the first light exit plane of the first light-conducting member;
a first reflective layer positioned on the first light-conducting member at an area other than on the first opposite plane;
a second light-conducting member including:
　a second light entry plane and a second light exit plane,
　a second opposite plane that faces the second light entry plane and the second light exit plane,
　a second light entry portion comprising an area between the second light entry plane and the second opposite plane and including the second light entry plane and a portion of the second opposite plane facing the second light entry plane, and
　a second light exit portion comprising an area between the second light exit plane and the second opposite plane and including the second light exit plane and another portion of the second opposite plane facing the second light exit plane;
a third diffractive optics element positioned between the second light entry plane of the second light-conducting member and the first light-conducting member;
a fourth diffractive optics element positioned between the second light exit plane of the second light-conducting member and the first light-conducting member; and
a second reflective layer positioned on the second light-conducting member at an area other than on the second opposite plane,
wherein
　the image light is at least partially diffracted by the first diffractive optics element and becomes first diffracted image light;
　at least some of the first diffracted image light is conducted into the first light-conducting member;
　the first reflective layer is provided in a position that reflects at least some of the first diffracted image light conducted into the first light-conducting member directly to the second diffractive optics element;
　a width of the first reflective layer is smaller than a width of the second diffractive optics element;
　at least some of the image light not diffracted by the first diffractive optics element is diffracted by the third diffractive optics element and becomes second diffracted image light;
　at least some of the second diffracted image light enters into the second light-conducting member from the second light entry plane of the second light-conducting member;
　the second reflective layer is provided in a position that reflects at least some of the second diffracted image light conducted into the second light-conducting member directly to the fourth diffractive optics element;
　a width of the second reflective layer is smaller than a width of the fourth diffractive optics element;
　a grating period of the first diffractive optics element and a grating period of the third diffractive optics element are different; and
　a grating period of the second diffractive optics element and a grating period of the fourth diffractive optics element are different.

10. An image display apparatus comprising the optical device according to claim 1.

11. An image display apparatus comprising the optical device according to claim 9.

12. The optical device according to claim 1, wherein
the light entry plane and the light exit plane are provided on a first surface of the light-conducting member,
the opposite plane is provided on a second surface of the light-conducting member, and
the first surface and the second surface are substantially parallel.

* * * * *